March 30, 1943.  E. D. REEVES  2,315,079
CONVEYING POWDERED MATERIAL
Original Filed July 17, 1939

Edward D. Reeves Inventor
By J. K. Small Attorney

Patented Mar. 30, 1943

2,315,079

UNITED STATES PATENT OFFICE 2,315,079

CONVEYING POWDERED MATERIAL

Edward D. Reeves, Cranford, N. J., assignor to Standard Oil Development Company, a corporation of Delaware Original application July 17, 1939, Serial No. 284,892. Divided and this application July 24, 1941, Serial No. 403,826

4 Claims. (Cl. 302—50)

This application is a division of my co-pending application Serial No. 284,892 filed July 17, 1939.

This invention relates to combined conveying means and injection feed apparatus and the said invention is fully disclosed in the following description and claims, reference being had to the accompanying drawing.

In carrying out vapor phase reactions wherein the material to be treated or converted is contacted with a solid adsorbent material which may or may not be a catalyst, certain advantages are secured by employing a powdered adsorbent material which flows concurrently with the material undergoing treatment or conversion. One method of operation employs feed means for the powdered adsorbent material into the material undergoing treatment, comprising a screw conveyor. However, when a powdered adsorbent material is directly fed by a screw conveyor into a flowing stream of say vaporized hydrocarbon material, there is imminent danger that the screw conveying feeding mechanism may become coated and clogged with gum-like, tarry or cokey material formed from the said hydrocarbon material and thus impaired in its operation.

An object of this invention is to provide an apparatus adapted to feed a powdered adsorbent material, such as a powdered catalyst into a reactable material, such as a hydrocarbon oil, in such a manner that there is no clogging or plugging of the feed means due to tarry or coke deposits and consequently a free flow of adsorbent material into the reactable material is provided.

Another and more specific object of this invention is to provide means for dispersing or suspending a powdered adsorbent material, such as powdered clay, pumice, silica gel, plural gels and the like, in a gas, such as nitrogen, hydrogen, steam, flue gas, carbon dioxide or the like or mixtures of these and then injecting this dispersion into a flowing stream of reactable material, such as a hydrocarbon oil. The above objects are attained by apparatus illustrated in the accompanying drawing in which, Fig. 1 is a vertical section of a combined conveying means of a horizontal feed injection apparatus;

Similar numerals refer to similar parts throughout the several views.

Figure 4:
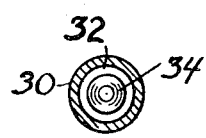
Fig. 4 is a section taken along the line IV—IV of Fig. 2.
Figure 3:
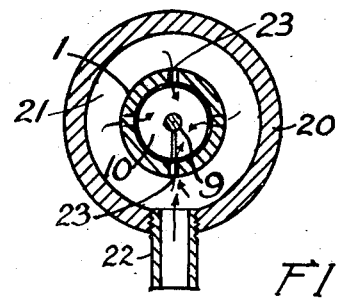
Fig. 3 is a section taken along the line III—III of Fig. 2.

Referring to Figs. 1 to 4, the principal elements of the device consist of a screw conveyor 1 or some similar device, a cylinder or block 2 containing a dispersing chamber in which a solid adsorbent material, such as pumice, is dispersed in a gas such as steam and an injector 3 in which the dispersed material is fed into a stream of hydrocarbon material. The assembly is supported by legs or standards 4, 5 and 6. The adsorbent material is introduced into the system from hopper 7 which is provided with valve means 8 or some similar device. The shaft 9 of the screw 10 carries a tightly mounted pulley 11 adapted to be driven by a motor or the like.

Figure 2:
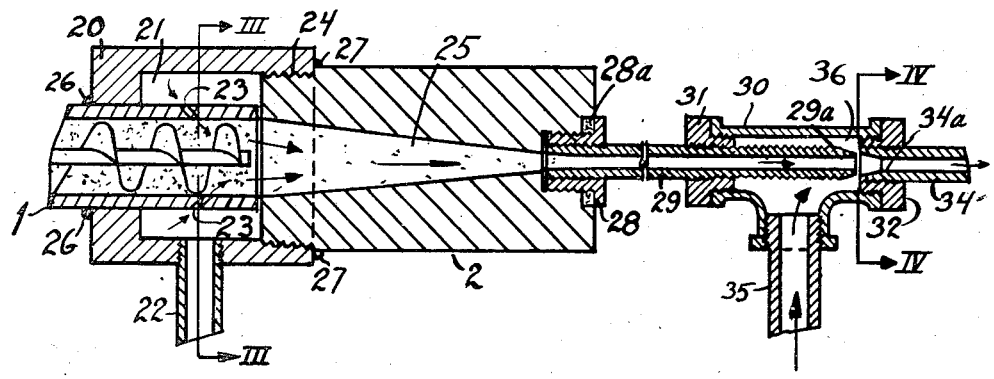
Fig. 2 is an enlarged vertical section, taken between the lines II—II of Fig. 1.
Figure 1:
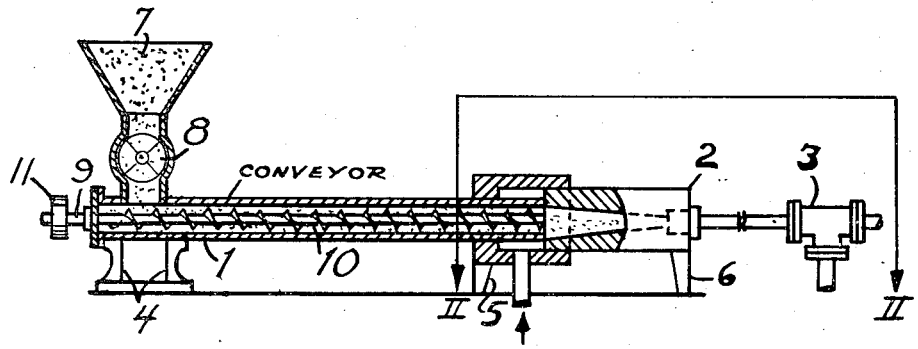

The construction and arrangement of the dispersing chamber is shown most advantageously in Fig. 2 from which it will be observed that the discharge end of conveyor 1 is housed in a cap or closure member 20 and forms with the casing of the conveyor within said cap, an annular space 21 into which projects a pipe or other fluid conduit means 22 adapted to conduct a gas, of the character previously referred to, into said annular space. Gas introduced under a positive pressure into annular space 21 is forced into the interior of the conveyor 1 through openings or ports 23. These ports are inclined from the vertical and are disposed a short distance from the end of the conveyor casing. The block or cylinder 2 is in screw-threaded engagement with cap 20. The bore of the block 2 forming the dispersing chamber 25 is substantially frusto-conical in shape, its greater diameter being substantially that of the internal diameter of the conveyor casing. As shown, the inner face of the block which contains the dispersing chamber abuts the discharge end of the conveyor casing and cap 20 is welded to the casing of the conveyor at 26 while block 2 is welded to the cap 20 at 27. The block 2 need not be cylindrical but may have other forms.

At the discharge end of chapter 25, the internal diameter of the same is relatively small. That is to say, it may be substantially $\frac{1}{8}$ to $\frac{1}{16}$ the internal diameter of the greatest diameter of the chamber 25. A bushing 28 projects into the block 2 and through it a pipe 29 also of bore size corresponding in internal diameter to the diameter of the chamber 25 at its smaller end, extends into chamber 25. A gasket or other packing means 28—a is provided in a recess of block 2 as shown. At its opposite end, pipe 29 projects into a T fitting 30 being held in position therein by bushing 31. The combination of the T 30, pipe 29 and pipe 31 forms an injection means.

It will be understood that instead of using the injector shown, any known means for mixing two fluid streams may be employed, the only requirement being that the fluid dispersion be under sufficient positive pressure to prevent the reactable material entering pipe 35, in the modification shown, from moving in the direction of the end of the screw conveyor. In other words, the injection means shown could be replaced by two pipes joined together and adapted to conduct the mixture of reactable material and the dispersion away from the dispersion chamber after the confluence of the streams. The tapered end 29—a of pipe 29 projects within the flared or splayed end 34—a of pipe 34 forming an annular space 36. Pipe 34 is secured in position in T 30 by bushing 32. Suitable washers or gaskets may be provided in known manner to effect a seal against the escape of fluid as required.

In the operation of the device illustrated in Figs. 1 to 4, steam, hydrogen, nitrogen, methane or some similar gas is introduced into chamber 21 through pipe 22 and from there the gas passes into the interior of conveying means 1 through ports 23 where it admixes with the powdered clay, pumice or the like and due to its pressure forces the powdered material into chamber 25 where it is maintained in suspension in the gas by the high velocity of the gas. It will be understood that the number of ports 23 may be greater or less than the number shown in the drawing. Also the arrangement of the ports 23 around the conveyor casing may extend over a lesser arc than the circumference, for example, they may be located only in the lower half of the conveyor casing. The ports may be located at a distance from the end of the screw conveyor determined with reference to other features of the installation. The preferred location of the ports is just behind the discharge end of the screw.

The pressure of the gas maintained in chamber 25 will vary depending on numerous factors but in order to disperse efficiently a powdered material having a size such that all of it will pass through a 100–200 mesh screen, the size of ports 23 is of an order such that a pressure drop of 10 to 30 lbs. takes place when a gas is forced through them. The actual gas pressures depend on the degree of subdivision of the powdered material, the dimensions of the ports and other factors.

The powdered material dispersed in the gas passes into pipe 29. Meanwhile a reactable material such as a hydrocarbon oil, say a gas oil, is introduced into the system through pipe 35 and that material together with the gas containing the dispersed solid are discharged through pipe 34 to the preheaters and the reaction vessel.

It will be recognized by those skilled in the present art that the inventive novelty herein involved is not limited to the precise details of construction described heretofore and illustrated in the drawing and that numerous modifications falling within the spirit of the invention will be readily apparent to those familiar with devices of the character described.

I claim:

1. In a feeding mechanism of the character described, the combination with an injection means for introducing reactants of a block having a bore extending through said block, said bore being of greatly reduced internal diameter at one end thereof, closure means for closing the end of the bore opposite the end of reduced diameter forming a chamber, a screw conveyor having a casing communicating with said chamber and forming an annular space with said closure means, ports in said casing disposed in close proximity to the discharge end of said conveyor and effecting communication between said annular space and the interior of said casing, a conduit for supplying a gas in communication with said annular space, and a conduit of relatively small internal diameter connecting the chamber with the said injection means.

2. The combination as set forth in claim 1 in which the ports are symmetrically disposed about the circumference of the conveyor casing.

3. The combination as set forth in claim 1 in which the conduit connecting the chamber and the injection means has a diameter substantially equal to the diameter of the bore at its smaller end.

4. A feeding mechanism of the character described including in combination a block having a bore extending therethrough to form a chamber, said bore being tapered and having a reduced diameter at one end thereof forming the outlet from said chamber, closure means attached to said block opposite the outlet end thereof, a screw conveyor for conducting powdered material to said chamber and having a casing extending through said closure means, said casing communicating with said chamber, said casing forming an annular space with said closure means, said casing being provided with ports adjacent the discharge end of said conveyor and effecting communication between said annular space and the interior of said casing, means for supplying gas to said annular space, an injection means and a conduit of small diameter connecting the outlet end of the chamber with said injection means, said injection means having an inlet for fluid reactants and an outlet for the mixture of reactance and powdered material.

EDWARD D. REEVES.